United States Patent
Manis et al.

(10) Patent No.: US 7,245,625 B2
(45) Date of Patent: Jul. 17, 2007

(54) NETWORK-TO-NETWORK ADAPTOR FOR POWER LINE COMMUNICATIONS

(75) Inventors: Constantine N. Manis, Monmouth Junction, NJ (US); Oleg Logvinov, East Brunswick, NJ (US)

(73) Assignee: Arkados, Inc., Piscataway, NJ (US)

( * ) Notice: Subject to any disclaimer, the term of this patent is extended or adjusted under 35 U.S.C. 154(b) by 0 days.

(21) Appl. No.: 10/211,033

(22) Filed: Aug. 2, 2002

(65) Prior Publication Data
US 2003/0039257 A1 Feb. 27, 2003

Related U.S. Application Data

(60) Provisional application No. 60/310,182, filed on Aug. 4, 2001.

(51) Int. Cl.
*H04M 11/04* (2006.01)
*H04L 27/00* (2006.01)

(52) U.S. Cl. .............. 370/401; 370/463; 370/466; 375/222; 340/310.02; 340/310.08

(58) Field of Classification Search .............. 340/310.01–310.08; 370/338, 389, 401, 463, 370/465, 466, 467, 469; 375/219, 220, 222
See application file for complete search history.

(56) References Cited

U.S. PATENT DOCUMENTS

| | | | |
|---|---|---|---|
| 4,815,106 A | | 3/1989 | Propp et al. |
| 5,051,720 A * | | 9/1991 | Kittirutsunetorn ..... 340/310.02 |
| 5,192,231 A | | 3/1993 | Dolin, Jr. |
| 5,381,462 A * | | 1/1995 | Larson et al. ......... 379/106.06 |
| 5,452,344 A * | | 9/1995 | Larson .................. 340/310.01 |
| 5,554,968 A * | | 9/1996 | Lee ...................... 340/310.01 |
| 5,684,826 A * | | 11/1997 | Ratner ..................... 375/222 |
| 5,699,276 A * | | 12/1997 | Roos ..................... 379/106.03 |
| 5,705,974 A | | 1/1998 | Patel et al. |
| 5,777,769 A | | 7/1998 | Coutinho |
| 5,864,284 A * | | 1/1999 | Sanderson ............. 340/310.01 |
| 5,886,732 A | | 3/1999 | Humpleman |
| 5,982,276 A * | | 11/1999 | Stewart ................. 340/310.01 |
| 6,040,759 A * | | 3/2000 | Sanderson ............. 340/310.01 |
| 6,091,320 A | | 7/2000 | Odinak |
| 6,348,875 B1 * | | 2/2002 | Odinak et al. ......... 340/825.52 |
| 6,577,231 B2 * | | 6/2003 | Litwin et al. .......... 340/310.01 |
| 6,965,302 B2 * | | 11/2005 | Mollenkopf et al. ........ 370/475 |
| 6,998,962 B2 * | | 2/2006 | Cope et al. ................ 370/351 |
| 2002/0090961 A1 * | | 7/2002 | Walley et al. .............. 455/462 |

* cited by examiner

Primary Examiner—Alpus H. Hsu
(74) Attorney, Agent, or Firm—Mintz, Levin, Cohn, Ferris, Glovsky and Popeo, P.C.

(57) ABSTRACT

A portable, pluggable power line communications device provides convenient interfacing and connectivity between separate data networks interconnected over the same conventional electric power conveying media. The power line communications device plugs into a single electrical outlet, and includes a controller that is programmable at the device or remotely. Remote programming is achieved over the same power media to which the communications device is coupled, or by wireless link. The power line communications device controls data communications signal transfer over the common electric wiring of a local network, and conducts high-speed communications and download of multimedia signals from an upstream network controllers using the common electric power media. The data communications signals of the co-existing, different networks are encoded to permit differentiation at the power line communications device.

25 Claims, 4 Drawing Sheets

NETWORK-TO-NETWORK ADAPTOR FOR POWER LINE COMMUNICATIONS

CROSS REFERENCE TO RELATED APPLICATION

This application claims the benefit of U.S. Provisional Appln. No. 60/310,182 filed Aug. 4, 2001, which is incorporated by reference herein.

FIELD OF THE INVENTION

This invention relates to the field of data communications over conventional utility electric power conveying media, and more particularly to a communications interface apparatus for interconnecting networks using electric power lines and wiring of a conventional utility electric power distribution system.

BACKGROUND OF THE INVENTION

Digital and analog data communications over conventional utility electric power lines is an established method for point-to-point and point-to-multipoint communications between computing devices. In such communications, a data signal is superimposed on the voltage signal of a 50 to 60 Hertz alternating current (AC) power line using a higher frequency carrier signal. Typically, a central computer uses such a power line communications medium to control remote power applications or monitor remote utility usage, e.g., read a household power meter.

In more sophisticated data communications applications, fiber optic and coaxial cables typically are used in parallel with AC power lines to permit high speed communications. See, e.g., U.S. Pat. Nos. 5,886,732 and 5,699,276, incorporated by reference herein. Exemplary data communications service applications that use such high speed data communications media include Direct Subscriber Link (DSL) or cable television delivery.

When a plurality of locally administered electronic communications devices, such as a VCR, a television, a heater or other generic appliances, is connected over the electric power wiring of a building in a local area network (LAN) configuration, care must be taken to isolate the LAN from any other communications signals that may be present on electric power wiring or lines external to the LAN. See U.S. Pat. No. 6,091,320, incorporated by reference herein. Consequently, a data communications connection boundary device, such as a signal isolation block, usually must be professionally installed in the electrical power system between an upstream wide area network (WAN), which typically is external to the building, and a LAN internal to the building to separate the two communications networks. The isolation block typically limits the data communications connections to include only a single electronic communications device, such as a control computer, on the WAN side, i.e., outside of the building, and a specified number of individual electronic communications devices on the LAN.

Further, it is known that some electronic communications devices, on both a LAN and a WAN, sometimes do not receive data signals transmitted to such devices over the power lines or wiring by a source communications device, for example, a network communications controller. The target communications device may not receive the data signals, i.e., is "hidden" from the source device, because of the specific implementation of a data communications connection boundary device between the networks. In addition, the attenuation and interference characteristics in networks, which have a more pronounced effect on data signal communications where a target device is located a large distance from the source device, may cause the target device to become hidden from the source device. Although a conventional data signal, amplification device may be used to amplify an attenuated signal, more sophisticated and expensive electronics, such as bridges and routers, usually also must be installed in a network to overcome the problem that the target device otherwise does not receive data signals from a source device, such as a controller, in another network.

Thus, there exists a need for a simple, inexpensive data communications interface apparatus which can be interconnected with ease to the electric power conveying media of a conventional utility electric power distribution system, and which permits a multiplicity of electronic communications devices in a respective, multiplicity of networks to communicate data among one another over the common, conventional electric power conveying media of electric power utility lines and wiring of the power distribution system to which they are electrically coupled and from which they can receive electric power.

SUMMARY

In accordance with the present invention, a portable, power line communications device is readily engageable to electrical power conveying media of a conventional utility electric power distribution system and provides convenient interfacing and data communications signal connectivity between at least a first data network and a second data network, where the first and second networks are electrically coupled to each other over common electrical power conveying media of the power distribution system. The power line communications device receives and decodes encoded first data communications signals, which have been conveyed over the power conveying media and have network identification codes corresponding to the first or second network, or an electronic communications device within the first or second network, and generates and causes to be transmitted onto the power conveying media encoded second data communication signals, where the encoding of the second signals is based on and includes at least a portion of the identification codes present on the first data communications signals.

In a preferred embodiment, the power line communications device establishes a network connection between two or more local area networks (LANs). The LANs are physically located within the same building, such as a house or a high rise hotel, or in separate buildings, and are interconnected over common electric power lines and wiring of an electrical power distribution system. In an alternative preferred embodiment, the power line communications device provides communications connectivity between a single LAN and an external access network, or a larger wide area network (WAN), over common electric power conveying media of a conventional power distribution system. In a further preferred embodiment, the power line communications device is plugged into a single conventional electrical outlet in a building and can be moved to different electrical outlets in the building as network signal conditions warrant.

In another preferred embodiment, the power line communications device includes a controller having a processor coupled to a memory. The processor executes a control management and communications program that provides for network-to-network communications over electric power media. The program is stored in the memory or can be downloaded into the device over electric power conveying media, e.g., utility electric power lines or electric power wiring within a building in which the device is located, to which the device is electrically coupled. The processor retrieves the program from the memory and executes selected algorithms included in the program based on activation of selection options, such as buttons or soft keys, on the device, or based on receipt of data signals transmitted from a remote computing device. The remote computing device is preferably connected to the power line communications device over the common electric power conveying media. Alternatively, the remote device communicates with the power line communications device via wireless links, such as infrared or radio frequency links, or other wired links, such as twisted pair or coaxial cable. The controller of the power line communications device executes an encoding and decoding algorithm which uses unique identification codes, such as destination addresses or data words, to differentiate among, and route data communications signals to, target electronic communications devices in the respective communication networks, such as WANs or LANs, which are interconnected with one another over common electric power conveying media.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF THE INVENTION

The present invention of a power line communications device is illustrated below in connection with a power line access terminator (PAT) which is readily engageable to electric power conveying media of a conventional utility electric power distribution system, such as a conventional sinusoidal alternating current (AC) electrical outlet electrically coupled to the conventional electric power wiring in a building or the, conventional utility electric power lines outside of the building which are coupled to the electric power wiring in the building. For purposes of the present invention, a building contains electric power conveying media located on the user side of a power meter and can encompass multiple buildings on the user side of a central distribution power meter, or multiple buildings on a downstream side of a PAT that is mounted externally to the buildings and where each building has its own power meter. The PAT permits simultaneous data communications among a plurality of electronic communications devices located in networks on either side (upstream or downstream) of the PAT. The networks, for example, are partially or preferably completely within (internal) or outside (external) a building in which the PAT is located. The PAT controls and facilitates exchange of data communications signals between a first network, or individual electronic communications devices within the first network, and a second network, or its electronic communications devices, where the second network is different than, or in an alternative preferred embodiment the same as, the first network. The PAT decodes received, encoded first data communications signals detected in the power conveying media and sent by the first network, and generates and transmits onto the same power conveying media encoded second data communications signals having at least some of the same network identification codes, including at least the destination address of a target electronic communications device, as the decoded first signals. The PAT further can act as a broadband communications gateway to an upstream, external wide area network (WAN) to permit direct delivery of high speed data services, such as Direct Subscriber Link (DSL) or cable television multimedia, to a local access network (LAN) or its electronic communications devices. The PAT, therefore, operates as a network-to-network interface that uses the existing electronic power conveying media of a standard utility electric power distribution system as a communications channel. The PAT does not require the installation of signal isolation blocks in a network to achieve network-to-network isolation. The PAT, instead, provides for network-to-network isolation through the use of encoding and formatting of data communications signals, such as, for example, by use of different modulation schemas in adjacent networks or separation of operating frequencies in such networks. Further, the advantageous use of the already existing (installed) electric power conveying media of the electric power distribution system results in a significant installation and maintenance savings for data communications service providers.

The PAT preferably is adapted to use digital data stream communications methods, and also can use analog methods. The data transfer speeds of a digital PAT configuration are sufficient to permit the delivery of a wide range of multimedia applications. The PAT also provides for data transfer associated with the traditional, lower speed data communications applications that, for example, remotely read power meters and control individual devices for power system load management.

Figure 1:
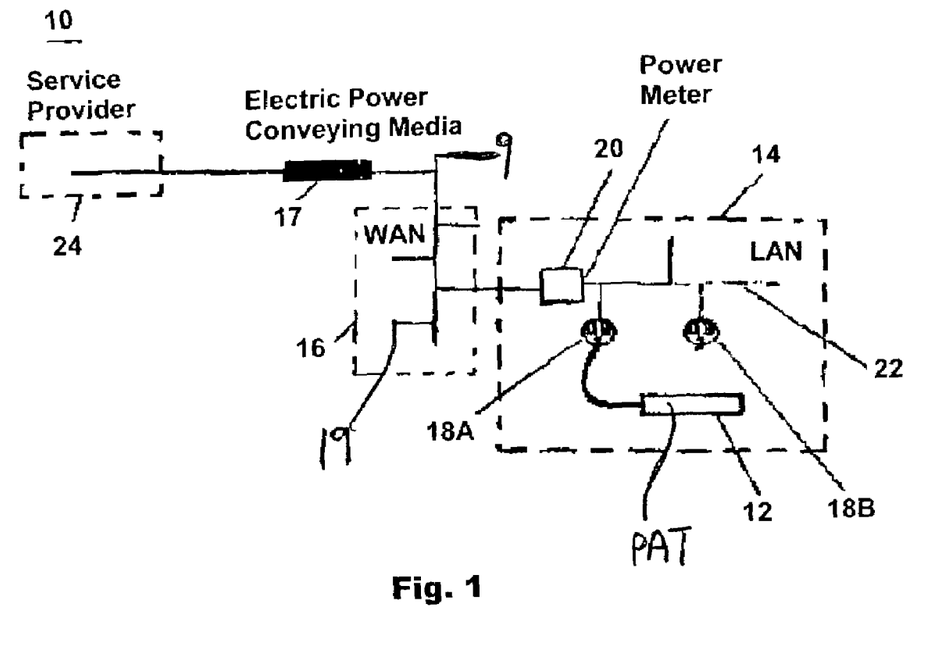
FIG. 1 is a block diagram of a network including a power line communications device in the form of a gateway power line access terminator (PAT) installed as an interface between an internal local area network and an external wide area network, in accordance with a preferred embodiment of the present invention.

FIG. 1 shows a preferred embodiment of a network 10 including a gateway PAT 12 installed as an interface between an internal local area network (LAN) 14 and an external wide area network (WAN) 16. The LAN 14 and WAN 16 are coupled to each other over common alternating current (AC) electric power wiring 22. The WAN 16 is coupled to a data communications service provider 24 over electrical power conveying media apparatus 17. The apparatus 17 can include conventional utility electric power lines and associated step-down and step-up transformers (not shown) to which other networks or service providers are electrically coupled. A power meter 20 is coupled to the wiring 22. The wiring 22 is contained inside a building, such as a home, apartment, office or other commercial building. The PAT 12 is on the user side of the power meter 20 and is plugged into an electrical outlet 18A coupled to the wiring 22 inside of the building. In accordance with the present invention, the PAT 12 can perform the necessary processing on data communications signals conveyed on the wiring 22 regardless of the position on the wiring 22 to which it is electrically coupled, i.e., the PAT 12 can be coupled at any available electrical outlet of the wiring 22 and still perform the necessary data signal processing operations. The LAN 14 can include electronic communications devices, such as computers, printers, information appliances, household appliances, power control modules, etc., that are coupled to the wiring 22. Although the wiring 22 is a preferred communication link for the LAN 14, wireless communications links using optical links, such as laser or infrared, acoustical links, such as voice or digital tone, and radio frequency (RF) links also can be used for all or a portion of the LAN 14.

In a preferred embodiment, the PAT 12 is a transceiver controller module including a microprocessor or other known processor integrated circuit, a memory integrated circuit, a power line interface for receiving and transmitting data communications signals, a voltage isolation circuit and data modulator-demodulator (modem) integrated circuit. The PAT 12 preferably has a memory buffer for temporarily holding a message during data processing, as well as programming software. The voltage isolation circuit preferably includes a low voltage circuit port coupled to internal components in the PAT 12 and a port for coupling to the AC voltage of electric power media, such as the wiring 22. The memory for both the buffering and the storage of the programming software can include volatile memory, such as dynamic-random-access-memory (DRAM), non-volatile memory, such as static RAM, flash memory and read-only-memory (ROM), and electronically re-programmable ROM, such as EPROM and EEPROM. The processing operations of the PAT 12 are controlled by a program that is stored in the memory or downloaded from either a network controller device, which may be integral to the WAN 16 or included in the LAN 14, or other means, such as a replacement software module. The ability to program the PAT 12 remotely represents a significant management and maintenance advantage over conventional approaches for controlling and interfacing data communication devices of networks. The physical size of the PAT 12 is limited only by the desired degree of integration and miniaturization of the modem and associated interface circuitry. In a preferred embodiment, the PAT 12 is contained in a medium sized box, similar to or smaller than a video recorder or a set-top box, or in a small wall plug unit similar to power adapters used in electronic equipment, such as desktop scanners or printers.

An electrical outlet in a typical building can have a wide range of voltages and frequencies, and typically, has nominal voltages of 110 or 220 VAC, and in some cases 480 VAC. In a preferred embodiment, the PAT 12 includes power line interface circuits that accommodate voltages from about 110 VAC to about 480 VAC, in addition to the extremes typically associated with power line disturbances, such as voltage spikes and brownout conditions. Nominal voltages may vary from about 70-135 VAC, based on distance from a step-down transformer and power line disturbances. The PAT 12 preferably provides connectivity in connection with an electrical outlet in the network 10 having an operating range of voltages from about 70-500 VAC.

The external WAN 16 routes to the LAN 14 upstream data signal feeds provided by the data service provider 24. In addition, data signal feeds can be introduced at local, unused network access locations 19 in the WAN 16, and provided from access networks located at central locations 9 in the network 10 that data communications service providers favor because of cost and convenience. The service providers include, but are not limited to, multimedia cable television feeds and high-speed internet and data links normally handled over telephone lines.

Since an electrical outlet in any building is connected directly to all of the distribution branches of a neighborhood electric power distribution system, the LAN 14 coexists on the same power media as the WAN 16 and any other local network that may be located in an adjacent building. Referring to FIG. 1, the controller module or an interface circuit of the PAT 12 includes an encoding and decoding software or firmware module that uniquely identifies and packetizes data in a communications signal, based on a received encoded data communications signal. In a preferred embodiment, the PAT 12 processes a received, encoded first data communications signal so that only a specific, unique destination address, which corresponds to an individual electronic communications device located in either the LAN 14 and the WAN 16, can receive and process the encoded second data signal generated and transmitted by the PAT 12.

In a preferred embodiment, all of the downstream devices within a specific internal LAN are programmed to have the same encoding and decoding protocol that exists in the downstream encoding and decoding software module of the PAT included in the LAN. The PAT also includes programming corresponding to the upstream encoding and decoding protocol that matches the encoding and decoding protocol of an upstream WAN to which the LAN is coupled over the power media. Encoding and decoding protocols are well known in the communications industry, and can take various forms which include allocation of carrier frequencies and time. For example, frequency division multiple access (FDMA) can be utilized to share communications devices in multiple respective LANs. In an exemplary FDMA implementation, a plurality of frequency channels is used to carry the data signals, and each channel carries a proportion of the totality of the message. In an alternative embodiment, scheduled time slots are used for individual device transmissions at a fixed frequency or multiple frequencies, such as time division multiple access (TDMA).

As a communications system becomes larger and any of the incorporated networks become more dispersed, a spread spectrum communications technique, such as code division multiple access (CDMA), is preferred in accordance with the present inventive technique. The signals are encoded and transmitted using a predetermined code word made up of chips, where each chip represents a low power signal at a different frequency. Moreover, communications systems or networks can be configured to utilize combinations of FDMA, TDMA and CDMA, as well as other like techniques. In a preferred embodiment, the PAT combines both EDMA and TDMA methods.

In a preferred embodiment, the PAT 12 includes programming software that permits separate encoding and decoding for at least two networks. For example, the PAT 12 can encode and decode one or more protocols for devices internal to the LAN 14 and one or more protocols for the upstream communications networks, such as the WAN 16. This capability of the PAT 12 permits a plurality of devices on the LAN 14 to function without the interference that can result from external communications activities on the common electric power conveying media. The PAT 12 advantageously permits that processing in software or firmware completely performs this multiple encoding and decoding, preferably using a powerful digital processor platform such as a conventional high-speed microprocessor, stand-alone computer, mainframe or personal computer, or a digital signal processor (DSP).

In a preferred embodiment, the PAT 12 includes dedicated hardware encoder and decoder chips with a predetermined, selectable variety of user programmable codes or frequency bands that can reduce processing requirements. To limit the available protocol options, a network preferably is designed to compensate for the signal attenuation characteristics associated with the separation distance between devices, as in a cellular phone system, and permit remote and repetitive re-use of identical codes or frequency bands.

In accordance with the present invention, a plurality of networks coexist on a same power distribution system, without destructive message interference. Each unique network has a controlling PAT and operates with a unique encoding and decoding protocol, preferably including a unique frequency or set of frequencies known to devices on the network that desire to establish data communications with the network. For example, referring to FIG. 1, devices on a neighboring network connected to the same portion of the power distribution system to which the LAN 14 is connected, but which are not part of the LAN 14 or under control of the PAT 12, have separate and unique network identification codes that the PAT 12 cannot recognize. The devices on the LAN 14, therefore, ignore such neighboring network devices. Alternatively, different sets of frequency bands are used to uniquely encode separately controlled and interconnected LANs. Access networks associated with the service provider 24 that desire to provide high speed data communications to the LAN 14, thus, must be informed of the selected identification codes corresponding to the encoding and decoding performed by the PAT 12. Alternatively, one-way access providers, such as cable television and multimedia services, can publish an encoding and decoding protocol, including identification codes, which all of the downstream user LANs can program into the upstream decoding portion of their unique PATs.

In a data communications system where simultaneous data signal transmission from different devices is likely to occur in a same time slot or at a same frequency on the communications channel, a wide variety of methods currently are known to minimize data degradation from such conflicts. For example, in a centrally controlled network system, a central controller typically uses an allocation method to determine which single station can transmit in a particular time or frequency slot. Alternatively, in a decentralized communication systems, such as an Ethernet, a device in a LAN that needs to transmit data monitors a communications medium for other traffic, and upon finding one, appropriates or wins control of the channel and transmits its message on such channel. If, however, the communications channel is in use, the device will defer the transmission until a later time.

In a preferred embodiment, the PAT 12 in the network 10 receives encoded data communications signals present at the electrical outlet 18A location on the wiring 22. The signals, for example, have been routed from the service provider 24, through the apparatus 17, the WAN 16 and then through the power meter 20 of the LAN 14. The PAT 12, based on the identification code of the LAN 14, decodes a received, encoded first data communications signal and generates and transmits onto the wiring 22, at the outlet 18A, a corresponding encoded second data communications signal whose encoding includes, preferably, only those destination addresses associated with the LAN 14.

In a preferred embodiment, the PAT 12 is a portable device that can use an internal battery, power available at the electrical outlet, or both, to energize internal components. The portability of the PAT 12 is extremely advantageous. It is known that an electronic communications device of the LAN 14, which is a target of a data communications signal transmitted by another electronic communications device, either internal or external to the LAN 14, sometimes cannot receive and process the transmitted signal so as to retrieve and utilize the data contained therein. This occurs because the target device receives the data signal in such an attenuated form that processing of the signal to extract the identification codes and the data contained therein cannot be performed. The signal attenuation may be substantial because of network impediments, such as loading, or because the target device is located at a far end of a building and the signal undergoes substantial attenuation based on the large distance that it must travel to reach the target device. The PAT 12, in accordance with the invention, can be relocated to a location in the LAN 14 that improves the data signal reception. The PAT 12, for example, can be relocated to a more central location in the LAN 14, such as electrical outlet 18B, which is also coupled to the electrical wiring 22 located on the user side of the power meter 20 in a building. By suitably relocating the PAT 12 within the LAN 14, the PAT 12 can receive and process the encoded data communications signals conveyed on the power media to ensure that a target device receives the data transmitted to it over the power media as a data communications signal by another electronic communications device.

The portability of the PAT also can be advantageously exploited as follows. As part of the system management functions of two or more co-existing networks, an upstream network controller queries and diagnoses problems that may be associated with the overall system by, for example, testing and verifying the communication medium and electronic communications devices. Based on an analysis of the results of the communications system performance testing, the central controller transmits a message to the gateway PAT of a LAN instructing a user to relocate the PAT, or any signal repeater PAT in a LAN, to a different location, e.g., another electrical outlet, in a LAN. The signal repeater PAT is described in detail below in the text accompanying the description of FIGS. 3 and 5.

Figure 2:
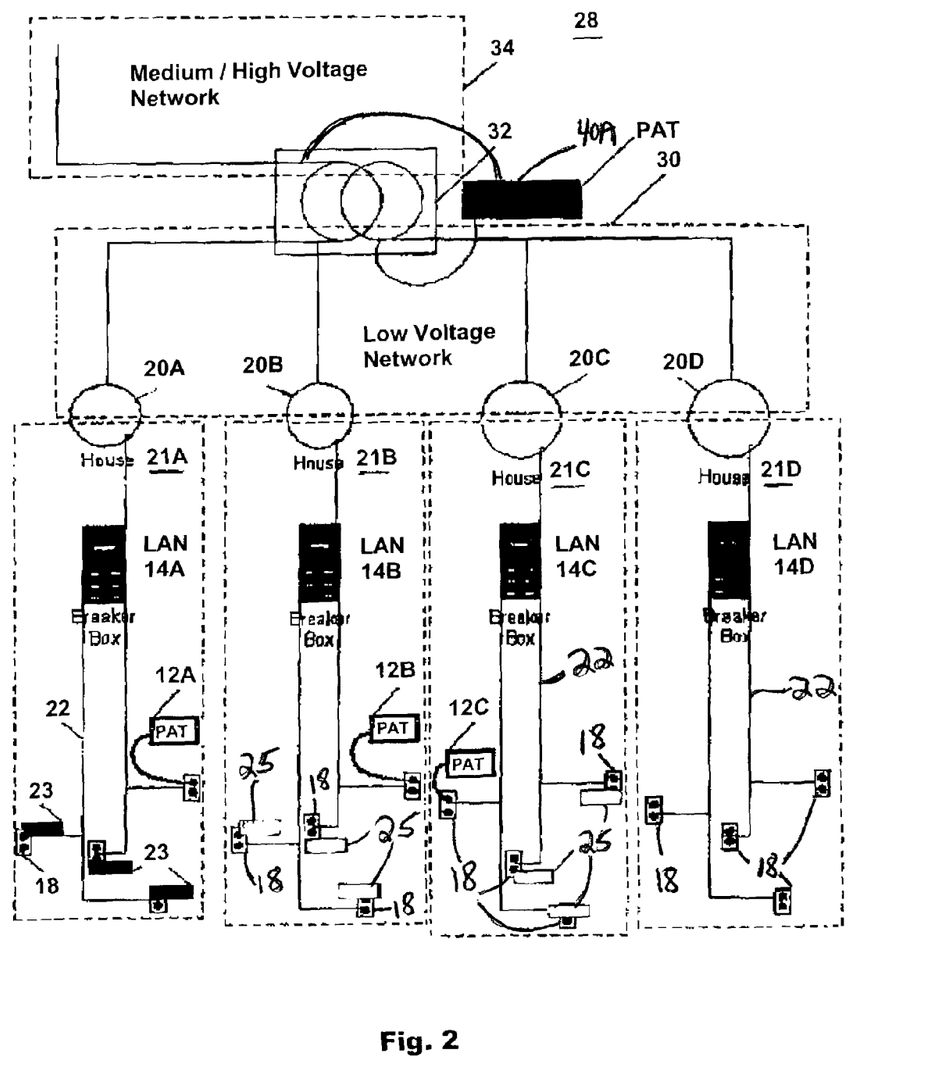
FIG. 2 is a block diagram of a network including a gateway PAT for providing data communications signal connectivity and electrical coupling between a higher voltage network and a lower voltage network including local area networks (LANs) containing respective gateway PATs, in accordance with a preferred embodiment of the present invention.

FIG. 2 shows a block diagram of a network 28 including LANs 14A-14D physically located in residential houses 21A-21D, respectively. The houses 21A-21D include power meters 20A-20D, respectively, which are coupled to a low voltage network 30 and the LANs 14A-14D. The LANs 14A-14C include gateway PATs 12A-12C located on the interior, or user, side of the power meters 20A-20C, respectively. The network 28 further includes a step-down transformer 32 that couples a medium/high voltage network 34 to the low voltage network 30. A gateway PAT 40A is installed at the transformer 32 and electrically couples the networks 30 and 34 and the LANS 14A-14D to one another, and provides data communications signal connectivity between the network 34 and the PATs 12A-12C in the respective LANs 14A-14C. The low voltage network 30 supplies voltage signals having a voltage level that the power consumer typically uses, which is preferably 110 or 220 VAC. The step-down transformer 32 converts higher voltage signals, which the power utility uses to traverse long distances in the network 34 with minimal losses, to the nominal 110 or 220 VAC. Each of the LANs 14A-14C, and electronic control devices 23 therein coupled to wiring 22 at respective electrical outlets 18, has unique encoding and decoding identification codes. The electrical outlets 18 in LANs 14B and 14C that do not include control devices coupled thereto constitute open, unused network access locations 25.

In a preferred embodiment, electric power utility providers utilize the network 34 to convey medium or high voltage signals and also data communications signals. The port terminals of the step-down transformer 32 convert the medium or high voltage signals to lower user voltages. The lower voltage signals are provided to the power meters 20A-20D and then to the wiring 22 in the respective houses 21A-21D. The gateway PAT 40A functions and is constructed substantially similar to the PAT 12 and, furthermore, includes data communications signal bypass and voltage isolation circuitry that permits the data signals in the network 34 to be routed to the downstream network 30 and ultimately the LANs 14A-14C. In a preferred embodiment, the gateway PAT 40A performs data processing operations on the data signals received from the network 34 to provide that only those data signals with identification codes corresponding to the PATs 12A-12C are forwarded downstream to the LANs 14A-14C, respectively. Therefore, the PATs 12A-12C contained within the respective LANs 14A-14C receive and process the encoded data communications signal generated at the PAT 40A, based on the encoded data communications signals which the PAT 40 receives from the network 34. As the LAN 14D does not include a PAT 12 device, the gateway 40A is not programmed to and does not generate encoded data signals for that network. Thus, the PAT 40A provides that any data communications signals carried over the network 34, and whose target is within the LANs 14A-14C, effectively bypass the step-down effects of the transformer 32 and are routed to the network 30 and further downstream to the PATs 12A-12C of the respective LANs 14A-14C.

In an alternative preferred embodiment, the PAT 12 from any of the LANs 14A-14C is mounted at an appropriate location on the exterior side of the local power meter 20, such as a wall mounting outside the building or at the step-down transformer 32, which is typically located on a utility pole. The PAT 12 also can be mounted adjacent to the transformer 32 in installations where the transformer 32 is located underground, even though this makes the PAT 12 less accessible. The mounting of the PAT 12 at the transformer 32 in the network 28 creates a larger LAN, which can include one or more buildings and conceivably one or more of the smaller LANs 14A-14D. Each of the individual LANs 14A-14C, however, still controls its unique local devices as the encoding and decoding module of each of the PATs 12A-12C is uniquely encoded with the identification codes of the respective LANs 14A-14C.

Figure 3:
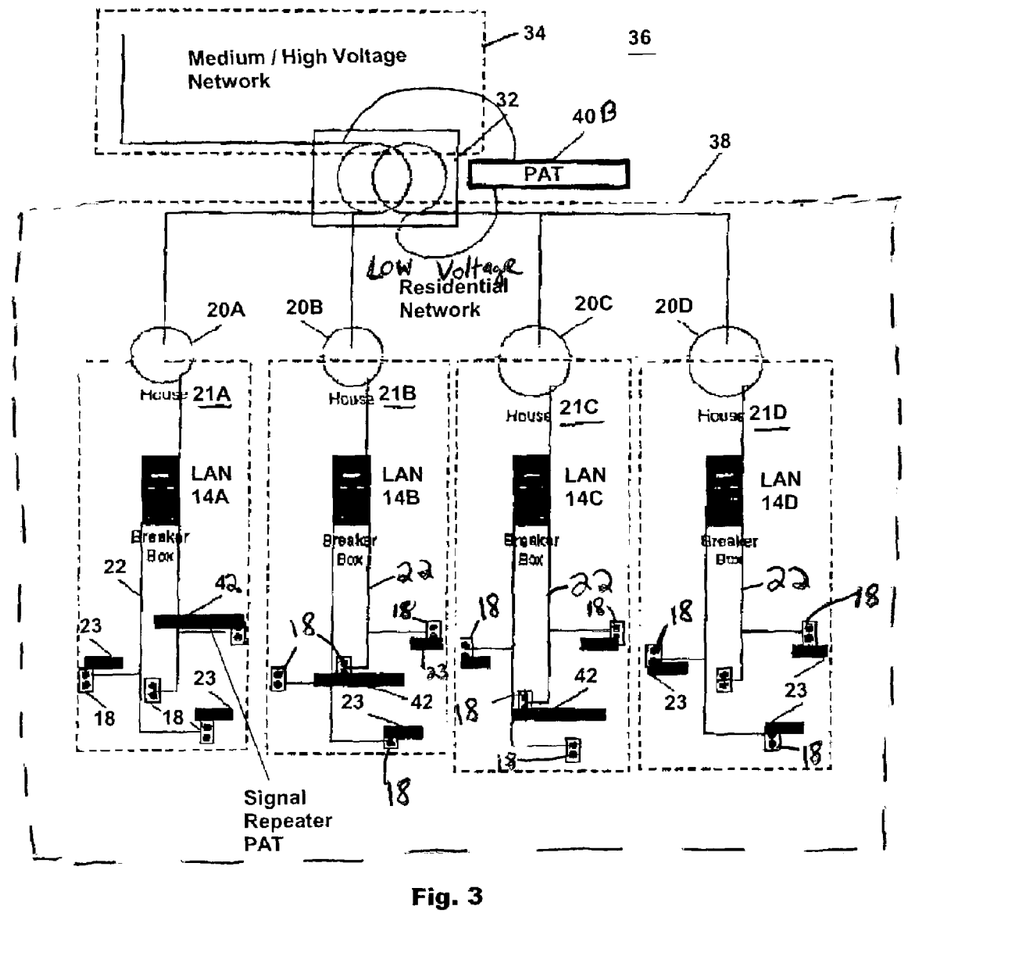
FIG. 3 is a block diagram of an area residential network including a gateway PAT providing data communications signal connectivity and electrical coupling between a higher voltage network and electronic devices in LANs which are included in a lower voltage residential network, in accordance with another preferred embodiment of the present invention.

FIG. 3 shows a block diagram of a network 36, according to another preferred embodiment of the present invention, including an area residential network 38 and a gateway PAT 40B implemented at a utility step-down transformer 32. Components in FIG. 3 having identical, or substantially identical, construction and operation as the components discussed above in connection with the network 28 of FIG. 2 are referred to below using like reference numerals. Referring to FIG. 3, the network 38 includes houses 21A-21D containing power meters 20A-20D and LANs 14A-14D, respectively. Electronic communications devices 23 are coupled to wiring 22 in each of the LANs 14A-14D at respective outlets 18. Upstream service providers operate on the higher voltage network 34 and the higher voltage signals are converted to local, lower network voltages across the port terminals of the step-down transformer 32 and then routed to the network 38. The gateway PAT 40B functions identically as, or substantially similar to, the PAT 40A described above in that it electrically couples the networks 34, 38 and 14A-14D to one another. The PAT 40B, unlike the PAT 40A, provides data communications signal connectivity between electronic communication devices in the network 38 and the network 34. Thus, the PAT 40B at the transformer 32 performs all of the decoding and encoding operations in connection with received, encoded first data communications signals and, from the first data signals, generates encoded second data signals that are routed to the devices 23 in the local networks 14A-14D. In a preferred embodiment, the gateway PAT 40B routes to the network 38 only those data communications signals having a destination address corresponding to identification codes of the respective devices 23 included in the LANs 14A-14D.

The interface functionality of the PAT 40 in the network 28 or 38, thus, enables the LANs 14A-14D to communicate with and process data from one or more upstream networks. Consequently, the upstream networks can be used to deliver multimedia links directly to a target device in the LANs 14A-14D over the utility power media without degradation. The use of the existing power media for such services represents a significant savings over conventional delivery conduits.

In a preferred embodiment, a PAT incorporates a local wireless (i.e., infrared, acoustical or RF) transmitter/receiver module, which is integrated within the device. Alternatively, the PAT communicates with a dedicated device, a gateway router or a bridge-router (Brouter) on the local network that performs the wireless communication function. As is known in the art, a complete room can be linked using an infrared medium. For wireless networks that span several rooms and, therefore, are not line-of-sight, a low power RF medium or sound can be used to allow transmission and reception through walls and other physical blockages.

In another preferred embodiment, the PAT incorporates optical transmitter and receiver functionalities to permit downstream local networking. The use of fiber optic cabling provides an interference-free communications medium, where the PAT provides the electric power media interface functionality with respect to the upstream providers. Further, the PAT may also incorporate a conventional copper wire based communications module which is for downstream local network devices and used with conventional copper wiring other than conventional electric power utility media. Examples of such conventional copper cabling include twisted pair, coaxial cable, etc.

In accordance with a preferred embodiment of the present invention, the PAT advantageously provides the encoding and decoding and interfacing functions for upstream communications paths, in addition to providing intelligent control and broadband communications over the local network communications medium.

Referring to FIG. 3, each of the networks 14A-14C includes a signal repeater PAT 42. The signal repeater PAT 42 operates to provide that electronic communications devices in the LANs 14A-14C, which constitute more distant devices to an external network that appear hidden from such external network, can receive and process data communications signals transmitted from the external network. In a preferred embodiment, the signal repeater PAT 42 generates and transmits an encoded second data communications signal including identification codes identical to those contained in a first encoded data communications signal received at the PAT 42. Consequently, the signal repeater 42 improves the probability that data communications signals are exchanged between the external network and a target electronic device 23 in the LANs 14A-14D

In a preferred embodiment of the network 36, the signal repeater PAT 42 of the LAN 14A is relocated within the LAN 14A to improve further the probability that a distant target device receives data communications signals from, and therefore can exchange data signals with, an external network.

In another preferred embodiment, the access network 38 is enlarged by the addition of step-up and step-down transformers to the power distribution system through the use of port conversion or shunting paths for the communications signals, where each transformer is electrically coupled to one or more of LANs 14A-14D. As all of the LANs 14A-14D can receive signals present on this larger network 38, it is more probable that an encoding conflict will occur and that the number of destructive message conflicts will increase. The installation of additional PATs at strategic locations in the network 38 to handle the increased communications traffic, in accordance with present invention, alleviates and otherwise minimizes such conflicts.

Figure 4:
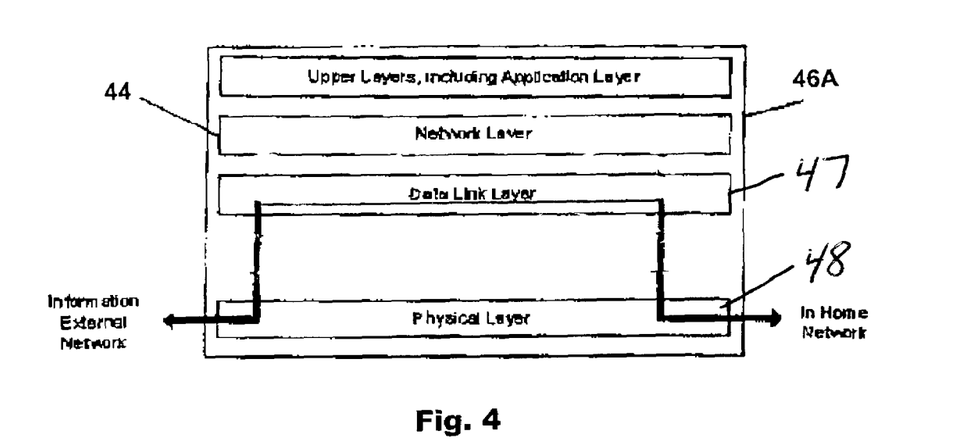
FIG. 4 is a hierarchical systems interconnect model of data signal processing operations performed at a gateway PAT, in accordance with a preferred embodiment of the present invention.

FIG. 4 is a hierarchical system interconnect model 46A of a PAT operating as a gateway. For purposes of this invention, the model 46A is a conventional open systems interconnect (OSI) model and the processing of encoded data communications signals utilizes a data processing layer that may be described as using layers at least as high as a data link layer or a network layer 44, or even higher layers, of the OSI model 46A. The PAT decodes received encoded data communications signals transmitted on the electric power media by an upstream external network and provides for downstream transmission onto the power media wiring of data communications signals having encoding corresponding only to those identification codes associated with the network(s) and electronic communications devices located downstream of the PAT. In addition, the PAT receives encoded data communications transmitted onto the power media by a downstream network and provides for upstream transmission onto the power media of data communication signals having the encoding of the targeted external network or electronic communications devices in the external network. In a preferred embodiment, the gateway PAT performs hybrid bridging by processing control signals at layers higher than the network layer 44 and by processing communications signals at a physical or convergence layer 48 of the OSI model 46A. For example, the gateway PAT can be utilized to perform the hybrid bridging associated with voice-over internet protocol (VoIP), where SIP (session initiation protocol) and SMDA (switched multimegabit data service interface protocol) packets are processed (bridged) at the higher layers of the model 46A and RTP (real time interface protocol) packets are processed (bridged) at the physical layer 48.

Figure 5:
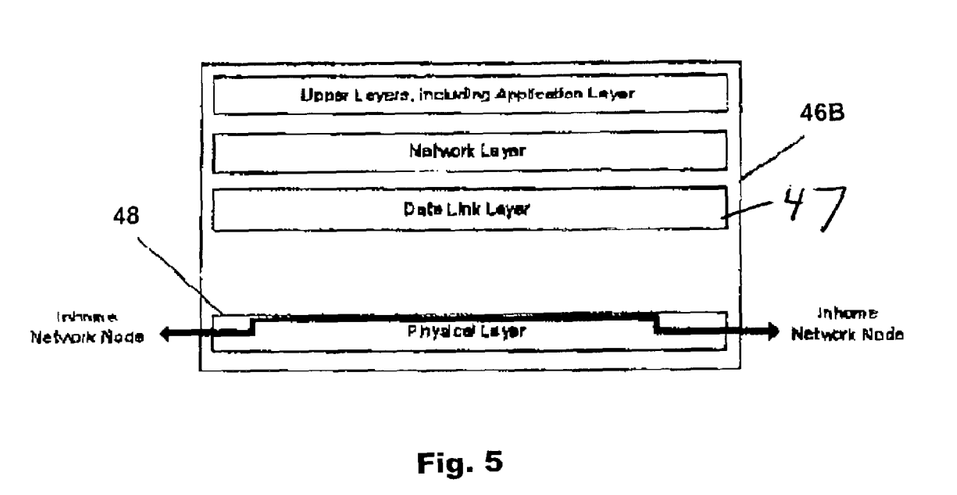
FIG. 5 is a hierarchical systems interconnect model of data signal processing operations performed at a signal repeater PAT, in accordance with a preferred embodiment of the present invention.

FIG. 5 is a hierarchical systems interconnect model 46B of a signal repeater PAT. The signal repeater PAT communicates only at the lowest layer of the OSI model 46, i.e., the physical layer 48. The signal repeater PAT preferably decodes received encoded data communications signals present on the wiring and having encoding corresponding only to destination addresses within a specific LAN, and generates and transmits onto the wiring data communications signals encoded with the same identification codes present on the received signals. For example, the signal repeater PAT receives, from a first LAN or first WAN, data communications signals including identification codes corresponding only to specific electronic communications devices on a second LAN and the signal repeater PAT creates a new signal for transmission onto the wiring encoded only with the identification coding associated with the destination address of the specific devices indicated in the received data signals. The signal repeater PAT, consequently, advantageously provides the benefit of low latency (quick) bridging between networks, as is required, for example, by voice-over packet and video streaming applications.

Thus, the present invention advantageously permits a service provider to insert a data communications signal onto electric power conveying media of an electric power distribution network at any point in the network with the destination address and identification codes associated with a target electronic communications device or a LAN. The PAT associated with the target device or LAN provides that the data in the transmitted data signal is conveyed over electric power media that is common to the transmitting and target device and received at the LAN or the specific target device, such as a television set in the case of multimedia downloading, or a computer network card/modem for data communications applications. Hence, the PAT permits delivery of data communications service without the cost of installing application-specific cables, such as hardwire or wireless equipment, in addition to the existing conventional electrical power distribution lines and wiring already present.

Although preferred embodiments of the present invention have been described and illustrated, it will be apparent to those skilled in the art that various modifications may be made without departing from the principles of the invention.

What is claimed is:

1. A communications apparatus for communicatively coupling a first power line data communications network to at least a second power line data communications network, wherein each of the first and second networks is for interconnecting a plurality of electronic communications devices and is on a same network branch of a utility electric power distribution system, wherein the branch includes utility electric power conveying media and is isolated from a portion of the power distribution system by at least one of a step-up and a step-down power transformer, the apparatus comprising:

a connection means for coupling to the power conveying media; and a transceiver communications interface coupled to the connection means and including a controller, wherein the controller includes a processor coupled to a memory, wherein the memory includes network identification codes corresponding to at least one of the first and second networks, and wherein the processor is adapted to utilize a network identification encoding and decoding protocol for processing encoded data communications signals containing a target network identification code transmitted by a source electronic communications device to a target electronic communications device, wherein the processor generates a target data communications signal based on the encoded data communications signals transmitted by the source device, and wherein the target signal includes a predetermined encoded network identification code corresponding to a power line data communications network designated by the target network identification code, such that data communications is achieved over the power conveying media between the target device and the source device, wherein each of the source and target devices is in the first or second network.

2. The apparatus according to claim 1, wherein the connection means comprises a pronged male power plug designed to matingly engage in a semipermanent manner with an electric power utility receptacle.

3. The apparatus according to claim 1, wherein the communications interface comprises:
a voltage isolation device having a first port compatible with a low voltage circuit within the controller and a second port compatible with an alternating current (AC) voltage of the power conveying media;
a holding buffer for temporarily storing a plurality of digital data words until said words can be transferred from the buffer to either a communications channel of a network or to the controller; and
a conversion device for transforming a serial digital data signal from a first protocol to a second protocol.

4. The apparatus according to claim 3, wherein the nominal value of the AC voltage is approximately 110 volts.

5. The apparatus according to claim 3, wherein the nominal value of the AC voltage is approximately 220 volts.

6. The apparatus according to claim 1, wherein the controller includes at least one of a mainframe computer, a personal computer, a microprocessor, a micro-controller and a digital signal processor.

7. The apparatus according to claim 1, wherein the memory includes at least one of a volatile memory and non-volatile access memory.

8. The apparatus according to claim 7, wherein the memory comprises at least one of a random access memory (RAM), serial memory, flash memory, read-only-memory (ROM) and electronically reprogrammable memory.

9. The apparatus according to claim 1, wherein the controller includes:
a network identification encoding and decoding module for encoding and decoding data communications signals based on the encoded data communications signals transmitted by the source device and based on at least one of frequency, modulation scheme, data format and data conveying medium.

10. The apparatus according to claim 9, wherein the encoding and decoding module is implemented using at least one of a frequency division multiple access (FDMA) protocol, a time division multiple access (TDMA) protocol and a code division multiple access (CDMA) protocol.

11. The apparatus according to claim 1, wherein the controller includes a configuration option selection means.

12. The apparatus according to claim 1, wherein the controller is remotely configurable.

13. The apparatus according to claim 1 further comprising a wireless communications means for coupling to a data network.

14. The apparatus according to claim 13, wherein the wireless communications means comprises an optical communications means.

15. The apparatus according to claim 14, wherein the optical communications means comprises an infrared communications means.

16. The apparatus according to claim 13, wherein the wireless communications means comprises at least one of an acoustical communications means and a radio frequency communications means.

17. The apparatus according to claim 1, wherein the first data network includes electronic communication devices communicatively coupled on a user side of an electric utility power meter, and the second data network includes electronic communications devices not on the user side of said utility meter.

18. The apparatus according to claim 1, wherein the first data network includes electronic communications devices communicatively coupled on a low voltage side of a power line transformer, and the second data network includes electronic communications devices not on the low voltage side of said power line transformer.

19. The apparatus according to claim 1, wherein the apparatus is portable.

20. The apparatus according to claim 1, further comprising at least one of a battery and a voltage transformer for powering electronic components internal to the apparatus.

21. A method for interfacing at least first and second power line data communications networks, wherein each of the first and second networks is for interconnecting a plurality of electronic communications devices and is on a same network branch of a utility electric power distribution system, wherein the branch includes a utility electrical power conveying media and is isolated from a portion of the power distribution system by at least one of a step-up and a step-down power transformer, the method comprising the steps of:
receiving from the media an encoded first data communications signal having a first network identification code and transmitted by a first network electronic communications device transmitter;
decoding said first signal;
processing the encoded data included in said decoded first signal;
creating a second data communications signal for transmission to a target electronic communications device based on the encoded data contained in the first signal, wherein the creating includes encoding said second signal using a second identification code, wherein the second identification code includes a predetermined encoded network identification code corresponding to a power line data communications network designated by the first network identification code; and
transmitting said second signal over the media to said target device.

22. The method according to claim 21, wherein the first and second network identification codes are identical.

23. The method according to claim 21, wherein the encoding and decoding of said first and second signals additionally includes a modulation and demodulation of said signals, respectively.

24. The method of claim 21, wherein the target device is included in at least one of the first and second networks.

25. The method of claim 21, wherein the first data signal is received with associated control signals and wherein the processing of first control signal is performed at least as high as an interface protocol network layer and the processing of the first communications signal is performed at a physical layer.

* * * * *